United States Patent [19]

West

[11] Patent Number: 5,186,270
[45] Date of Patent: Feb. 16, 1993

[54] OMNIDIRECTIONAL VEHICLE

[75] Inventor: A. Mark T. West, Kendal, England

[73] Assignee: Massachusetts Institute of Technology, Cambridge, Mass.

[21] Appl. No.: 783,640

[22] Filed: Oct. 24, 1991

[51] Int. Cl.$^5$ .................. B62D 11/00; B60S 9/215; B25J 5/00
[52] U.S. Cl. .................. 180/6.62; 180/7.1; 180/934; 180/9.44; 180/202; 305/18; 901/1
[58] Field of Search .................. 180/6.2, 6.44, 6.5, 180/6.6, 6.62, 6.7, 7.1, 7.2, 9.3, 9.34, 9.38, 9.44, 20, 199, 200, 202; 280/28.5; 901/1; 305/16, 17, 18, 15, 52

[56] References Cited

U.S. PATENT DOCUMENTS

| | | | |
|---|---|---|---|
| 3,695,736 | 10/1972 | Brown | 280/28.5 X |
| 3,746,112 | 7/1973 | Ilon | 180/7.2 X |
| 4,223,753 | 9/1980 | Bradbury | 180/6.2 |
| 4,715,640 | 12/1987 | Smith | 180/7.1 |
| 4,823,900 | 4/1989 | Fomam | 180/6.5 |

FOREIGN PATENT DOCUMENTS 1153266 8/1963 Fed. Rep. of Germany ....... 180/7.2

Primary Examiner—Margaret A. Focarino
Assistant Examiner—Kevin Hurley
Attorney, Agent, or Firm—Wolf, Greenfield & Sacks

[57] ABSTRACT

The invention provides controlled omnidirectional relative movement between a device and a selected surface in contact therewith. The device is preferably a vehicle having a first and second track mounted thereto, which tracks are parallel and spaced from each other and are independently driven in a first direction. A plurality of spheres are mounted in each of the tracks at intervals spaced in the first direction and the spheres in at least one of the tracks are driven to rotate in a second direction, generally perpendicular to the first direction. By suitably controlling the movements of the tracks in the first direction and of the spheres in the second direction, movement along any desired trajectory may be achieved with three degrees of freedom. By having the device stationary and the surface movable, an omnidirectional platform is provided.

21 Claims, 8 Drawing Sheets

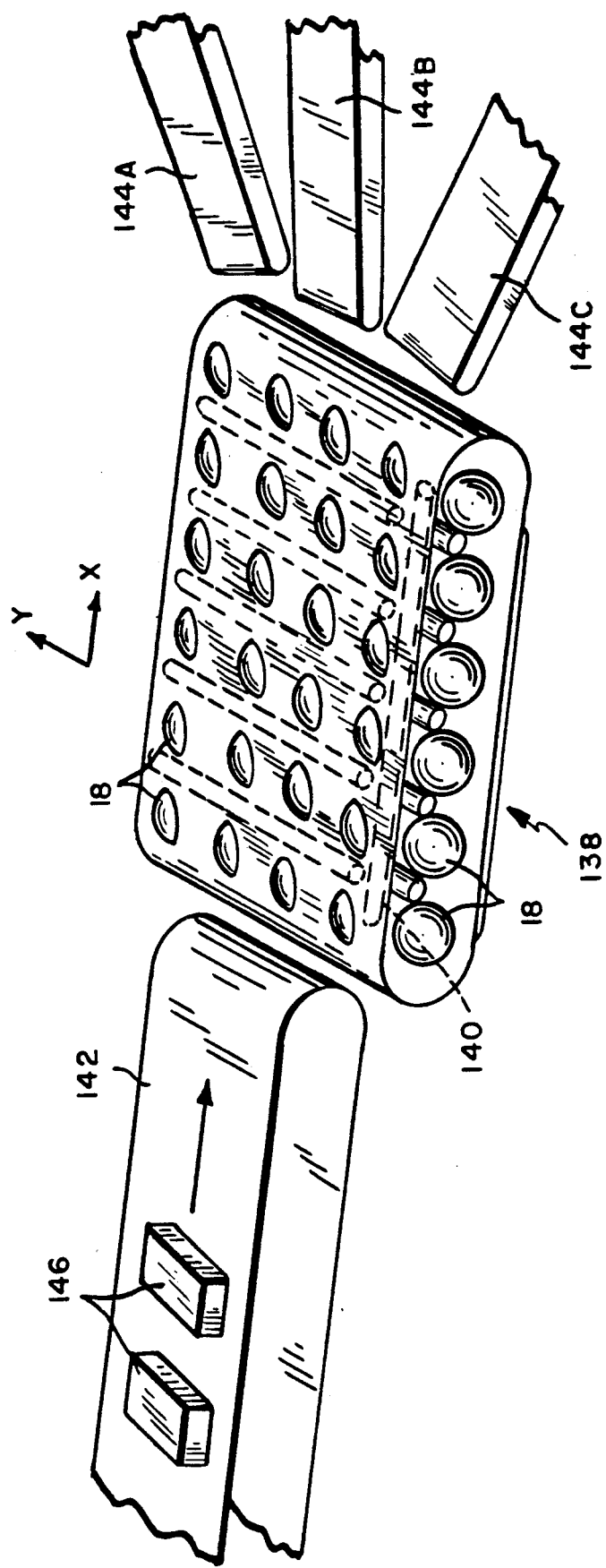

OMNIDIRECTIONAL VEHICLE

FIELD OF THE INVENTION

This invention relates to omnidirectional positioning devices and more particularly to omnidirectional vehicles or vehicle elements which may be utilized to achieve desired movements in at least three degrees of freedom.

BACKGROUND OF THE INVENTION

There is currently a need to move mobilized robots, forklift trucks, mobilized platforms or pallets, light earth moving equipment, mobile chairs for disabled persons and other vehicles utilized in industrial, military, police, research, medical and other applications with complete flexibility in three degrees of freedom. This permits the vehicle to (a) be moved from any existing position, at any angle of heading through a full 360°, (b) be turned in either direction through a full 360° about a substantially fixed axis perpendicular to the surface on which the vehicle is moving; and (c) be moved in any desired continuous trajectory on a surface from the starting position. Such a vehicle could be utilized alone in some applications, or could be connected as a base or foot to a larger device, for example, a robotic device, which is adapted to perform various functions either while being moved by the device of this invention or at various locations where the robot is moved by the device of this invention. With such additional robotic device, movement of an object in six degrees of freedom is possible.

While many devices are currently available for moving vehicles, including robots, to a desired position, there is only one device currently available which provides full flexibility of motion in three degrees of freedom. This is a device developed in Sweden using what is referred to as "the Mecanum wheel". Each Mecanum wheel has a plurality of angled rollers extending around its periphery. By controlling the rotation of all the wheels (normally a standard four wheels) on the vehicle, movement in a desired direction ma be achieved.

However, with this device, forward and sideway motions are coupled leading to a complex control system. The device also requires high friction for omnidirectional capability and has limited load carrying capacity because of the fact that loads are supported on slender roller spindles. The device also has limited capability to negotiate adverse terrain.

A need therefore exists for an improved omnidirectional vehicle which provides full range of motion in three degrees of freedom with a relatively simple control system. Such device should also be usable over varying degrees of adverse terrain, and should distribute the weight of the vehicle over many relatively strong points of contact so as to maximize weight carrying capacity.

Another related problem is to be able to move a work surface in three degrees of freedom relatively easily so that work may be performed thereon. Again, devices for performing such function easily and inexpensively do not readily exist. Except for the fact that the stationary member and the moving member are reversed in such application, the problems to be overcome are substantially the same.

SUMMARY OF THE INVENTION

In accordance with the above, this invention provides for controlled omnidirectional relative movement between a device and a selected surface in contact therewith. The device has a first track and a second track mounted thereto which tracks are parallel and spaced from each other. The first track and second track are independently driven in a first direction. A plurality of spheres are mounted in each of the tracks at intervals spaced in the first direction and the spheres in at least one of the tracks are driven to rotate in a second direction generally perpendicular to the first direction. Controls are provided for the various drives to create relative movement in a desired direction between the device and the surface.

While the device may be stationary and the surface a moveable platform resting on the device, for preferred embodiments the device is an omnidirectional vehicle moving on the surface. The tracks are preferably driven by first and second motors connected to drive the first and second track respectively. A single third motor may be provided to drive the spheres on at least one of the two tracks, and preferably on both tracks, or separate motors may be provided for driving the spheres in each track. Only a selected plurality of the spheres on each track are in contact with the surface at any given time, with the spheres in contact changing as the tracks are driven in the first direction. The spheres may be driven by a roller or rollers in friction contact with at least selected ones of the spheres in contact with the surface, which rollers are connected to be driven by the third motor in the second direction, the rollers in turn rotating the spheres in the second direction. Two rollers may be provided for each track to effect the sphere rotation, one of which rollers may be an idler or both of which may be active. The further distribute the weight of the vehicle, two or more rows of the spheres may be provided for each track, with the spheres for a given track being driven by a single roller or by multiple rollers.

The track may be inside the vehicle with only spheres projecting from the vehicle. For such a configuration, each track may include at least one low friction roller in the spaces between successive spheres and one or more chains may be provided interconnecting the rollers, with the chains of the respective tracks being connected to the first and second motors, respectively, to drive the tracks in the first direction. Alternatively, the tracks may be outside the vehicle, with each track including a plurality of interconnecting plates and the spheres being mounted in the plates in a manner so as to permit less than half of each sphere to project from the plate.

The motors for driving the tracks and spheres are preferably electric motors having controlled drive currents applied thereto. A joystick or other control mechanism may be provided for indicating the desired direction of movement with reference to a selected perspective and such mechanism may also be utilized to indicate a desired rotation of the vehicle about an axis perpendicular to the surface on which it is being moved. The perspective for controlling the vehicle may be from within the vehicle with the zero angle heading direction being the direction in which the vehicle is facing, or the perspective may be from outside the vehicle, with the zero angle heading direction being a selected direction on the surface.

A controller provides currents to each drive motor in order to achieve the desired motion in accordance with the joystick or other means of input. The controller for the device may, in addition to controlling the direction in which the device is moved, also control the rate in which such movement occurs.

The foregoing and other objects, features and advantages of the invention will be apparent in the following description of preferred embodiments of the invention as illustrated in the accompanying drawings.

IN THE DRAWINGS

FIG. 12 is a perspective view of an alternative embodiment of the invention wherein the teaching of the invention are being utilized to perform a conveyor function.

DETAILED DESCRIPTION

Figure 1:
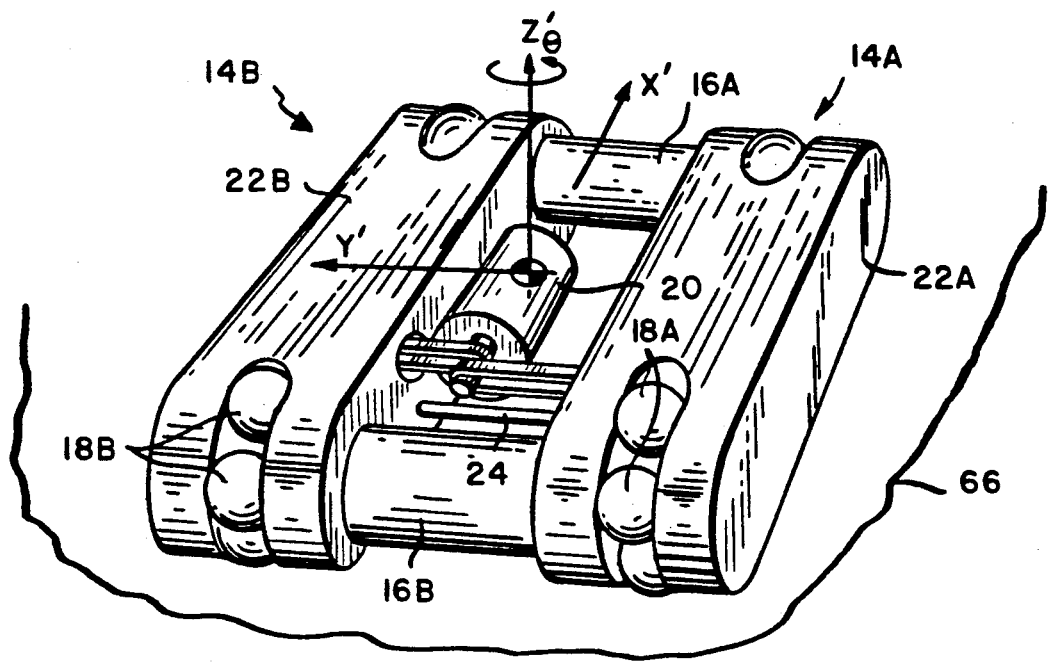
FIG. 1 is a top-front perspective view of a three-motor, internal track embodiment of the invention.
Figure 2A:
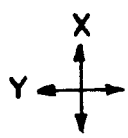
FIG. 2A-2G are diagrams illustrating various directions in which the vehicle of FIG. 1 may be moved.
Figure 2A:
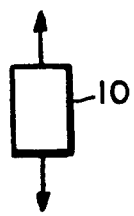
Figure 2B:
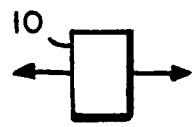
Figure 2C:
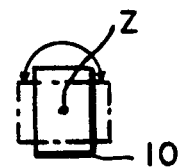
Figure 2D:
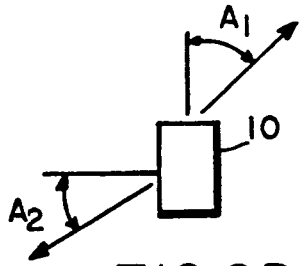
Figure 2E:
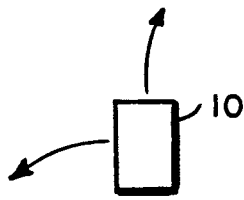
Figure 2F:

FIG. 1 shows an omnidirectional vehicle 10 in accordance with the teachings of this invention. In particular, referring also to FIGS. 2A-2G, the vehicle 10, shown diagrammatically in these FIGS., may be moved either forward or backward in the X direction (FIG. 2A), may be independently moved to the left or the right (i.e. moved in the Y direction) (FIG. 2B) or may be rotated either clockwise or counterclockwise about a Z-axis extending through the center of the vehicle perpendicular to the X-Y plane (FIG. 2C). From the dotted line orientation of vehicle 10 in FIG. 2C it is seen that when the vehicle is rotated, the Z axis remains stationary. The motions shown in FIG. 2A, 2B, and 2C are the basic motions of the vehicle. The basic motions may, however, be combined to permit motions in other directions. Thus, by suitably combining motions in the X and Y direction, the vehicle 10 may be caused to move at any desired angle (A) in the X-Y plane through the full 360° of such available angles. Two illustrative angles A1 and A2 which the vehicles may be moved are shown in FIG. 2D. Further, by combining movement in the X Y plane with rotation about the Z axis of the vehicle, the vehicle may be caused to follow any desired curved path in the X Y plane. FIG. 2E shows two illustrative curved paths. FIG. 2F shows a specialized curved path wherein the vehicle 10 is rotating about an external axis 12. Generally, the vehicle is capable of moving along any specified continuous trajectory on a surface where trajectory implies vehicle position and orientation as a function of time.

Figure 2G:
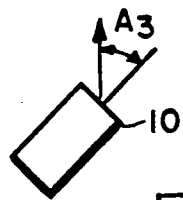

It should also be noted that the direction in which the vehicle is being moved may be from at least two different perspectives. In FIGS. 2A 2F, the perspective is generally considered to be from the vehicle itself with the vehicle being moved as if a driver were in the vehicle. Thus, if the vehicle were rotated 90° as shown for the dotted version of the vehicle in FIG. 2C, the X Y plane for the vehicle would also rotate 90°. However, it is also possible for the perspective to be outside the vehicle with, for example, a stationary joystick controller. Thus, the X Y plane would remain stationary regardless of the angular orientation of the vehicle as in FIG. 2G. Thus, with an X-Y plane of reference oriented as shown for FIGS. 2A-2G, a vehicle oriented as shown in FIG. 2G would move at an angle A3 to the direction in which the vehicle is pointed in order to move in the X direction in the plane of reference.

Figure 3:
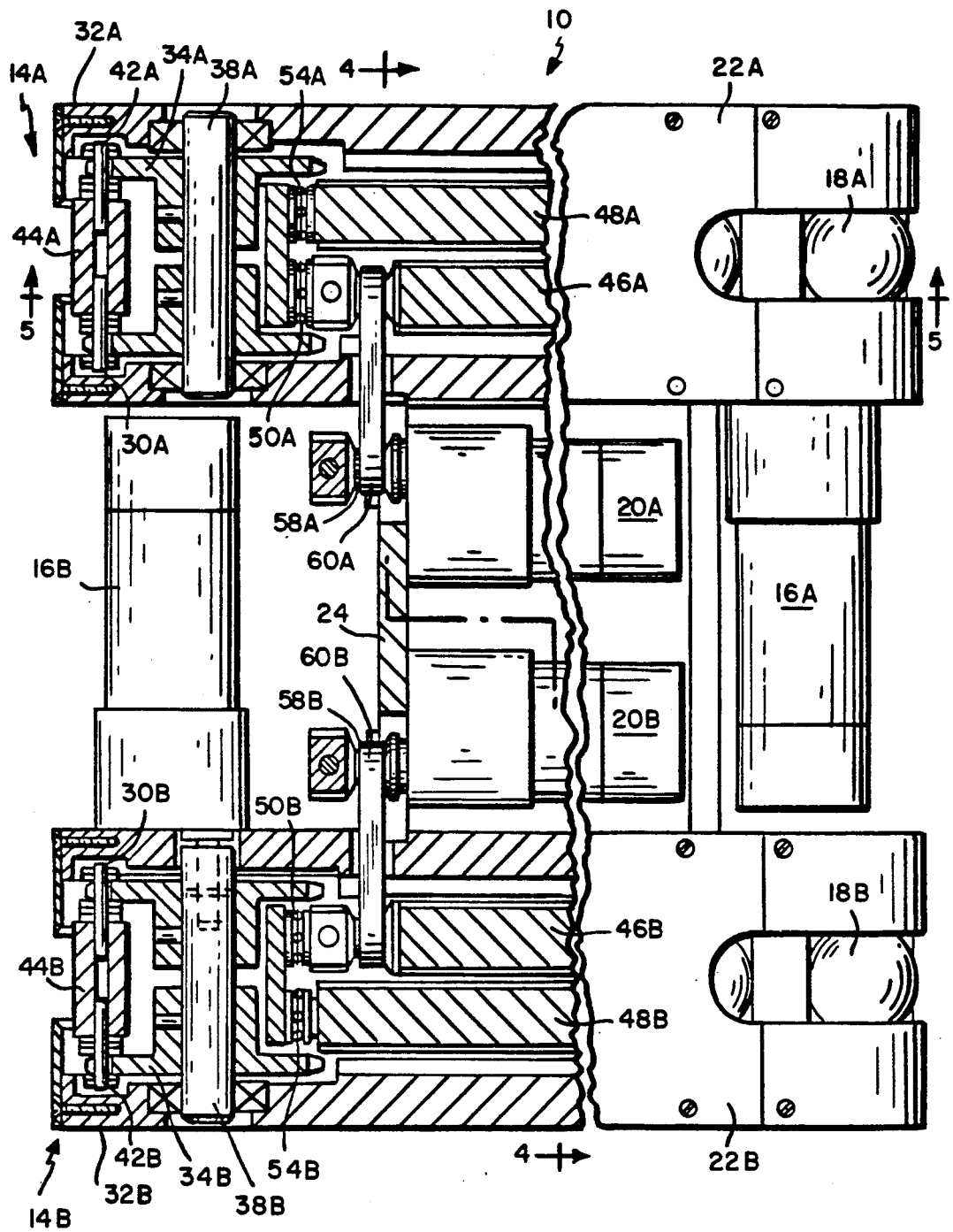
FIG. 3 is a partially cutaway top view of a four motor internal track embodiment of the invention.

In order to achieve such flexibility of motion, the vehicle 10 has a pair of independent tracks 14A and 14B. Each track is driven by a separate motor 16A, 16B, respectively. Each of the tracks has mounted therein a plurality of spheres 18, the spheres in track 14A being labelled 18A and the spheres in track 14B being labelled 18B. The spheres 18A and 18B may be rotated in the second direction relative to vehicle 10 in a manner described later by a single motor 20 as shown in FIG. 1 or by separate motors 20A and 20B as shown in FIG. 3. While not preferred, a single motor 20 may also drive spheres 18 in only a single one of the tracks. Each track 14 is mounted in a corresponding track housing 22A-22B which housings are secured together in spaced relation to each other by brackets or housing members 24 and/or by platform 28 (FIG. 11), or by other suitable means. Motor 16 and 20 may be mounted to housings 22 or to the intermediate housing members.

Figure 4:
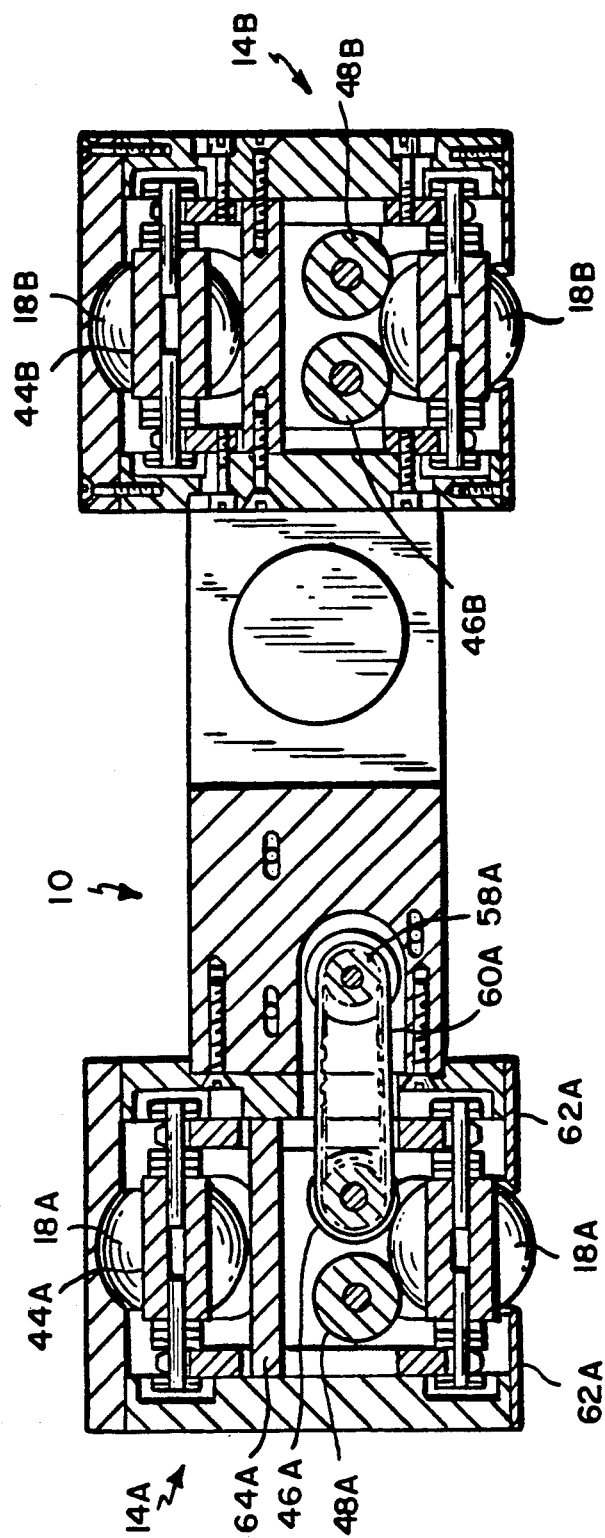
FIG. 4 is a sectional view taken generally along the line 4—4 in FIG. 3.
Figure 5:
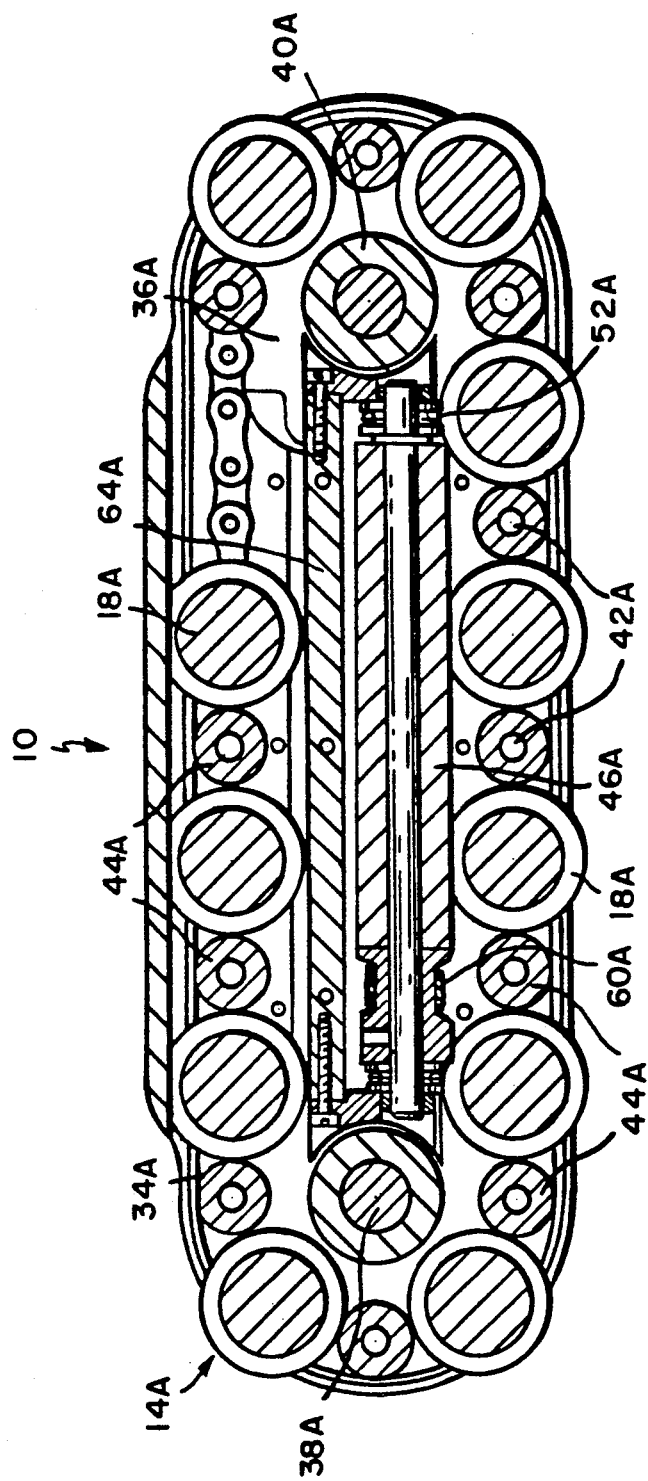
FIG. 5 is a sectional view taken generally along the line 4—4 in FIG. 2.

Referring to FIGS. 3-5, it is seen that each track 14 is formed of two chains, an inner chain 30 and an outer chain 32 both of which pass over a rear sprocket 34 and a front sprocket 36 (sprocket 36A is visible in FIG. 5). Each sprocket 34, 36 may be a single hub having two sets of teeth, one for each of the chains 30, 32, or each sprocket 34, 36 may be formed of separate hubs corresponding for each of the chains, which hubs are secured by set screws or other suitable means to sprocket axles 38 and 40, respectively. As may be best seen in FIG. 3, the output shaft from motor 16A is connected to drive axle shaft 40A and the output shaft from motor 16b is connected to drive axle 38B. Axles 38A and 40B and the sprockets 34A and 36B attached thereto are idle, being rotation by drive shafts and sprockets 38B, 40A, 34B and 36A through chains 30 and 32. To the extent gearing is required between a motor and the corresponding drive axis, such gearing may be in the motor housing as shown or external thereto. The driving of shafts 40A and 38B and of the sprockets attached thereto results in the driving of the corresponding tracks 14A and 14B.

Corresponding links in chains 30 and 32 are interconnected by pins 42, with a roller 44 being mounted between the chains on each pin 42. A sphere 18 is mounted in each track 14 between each pair of rollers 44, the rollers being formed of or coated with a low friction material such as TEFLON so that there is low friction between the rollers 44 and spheres 18. The spacing between rollers 44 and size of spheres 18 are such that the center of the sphere 18 is essentially in the plane containing the centerlines of its two adjacent rollers 44 and there is minimal clearance between the sphere and the rollers. Consequently, points of contact between the sphere 18 and its adjacent rollers 44 are diametrically opposed.

An active drive roller 46 and a passive drive roller 48 are positioned over the spheres 18 at the middle bottom of each track 14. Rollers 46 and 48 have a high friction outer surface, for example rubber, and press sufficiently against the spheres 18 which they are in contact with so as to make good friction contact therewith. Rollers 46 and 48 perform two functions, namely to rotate each sphere in the second direction and to maintain the position of the spheres under the centerline of the track, thereby supporting the weight of the vehicle.

Rollers 46 are supported in bearings 50 and 52 at their rear end and front end, respectively, while rollers 48 are supported in bearings 54 and 56 at their rear ends and front ends respectively. Bearings 50-56 are all mounted on projections formed in housings 14. Each active roller 46 is connected to the output shaft 58 of the corresponding motor 20 by drive belt 60. For the embodiment shown in FIG. 1, belts 60 (or a single belt 60) connect the output shaft 58 of a single more powerful motor 20 to rotate active rollers 46 for both tracks. As may be best seen from FIG. 4, rotation of a roller 46 in one direction causes the spheres 18 in contact therewith to be rotated in the opposite direction.

As may be best seen in FIG. 4, the housing 14A has a shelf structure 64 which holds spheres 18A against dropping under the influence of gravity when the spheres are in the upper portion of the track and has extensions 62 projecting from the bottom thereof, which assure that the spheres do not come out from the bottom of the track. The size of the spheres 18 and the rollers 46-48, the distance between the rollers 46-48 and the geometry of the housings 14 and the extensions 62 are such that some portion less than half of any sphere 18 protrudes from the bottom of the extension 62. Thus, the track for this embodiment of the invention is wholly internal to the housings 14, and the only moving member which makes contact with a surface 66 on which the vehicle is being driven is the spheres 18. This minimizes friction between the vehicle and surface 66 and also reduces the weight of the track which must be driven. However, while this configuration works well in a controlled environment such as a laboratory or a factory floor where the surface is firm, this configuration may not be advantageous in environments where the vehicle is to be driven on soft or muddy ground or over rough terrain which may result in the vehicle being supported on stationary housing projections 62, causing driving of the vehicle to no longer be possible. The internal track configuration discussed heretofor may also have difficulties moving over obstacles.

Figure 6:
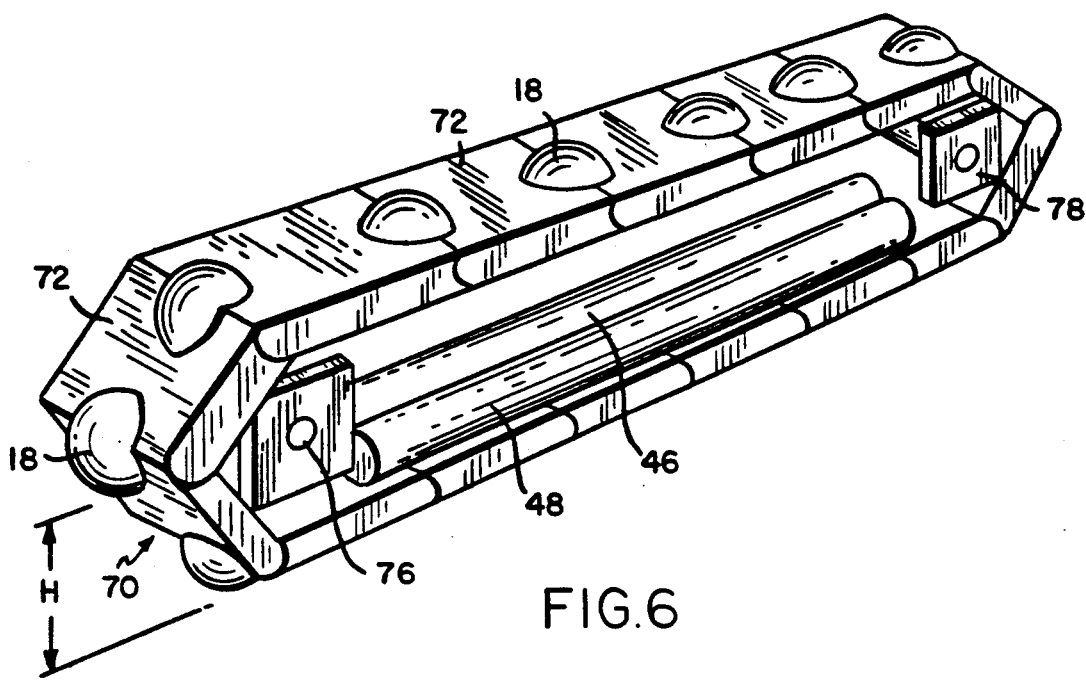
FIG. 6 is a perspective view of a track suitable for use in an external track embodiment of the invention.
Figure 7:
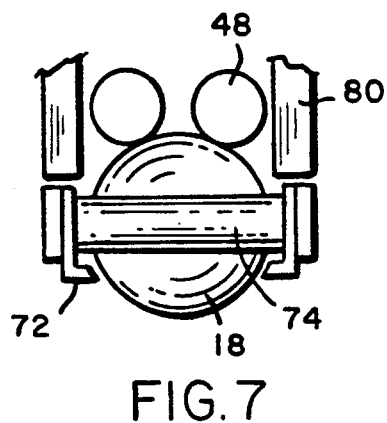
FIG. 7 is a partial sectional view of the track shown in FIG. 5 and a portion of the housing to which it would be mounted.
Figure 7A:
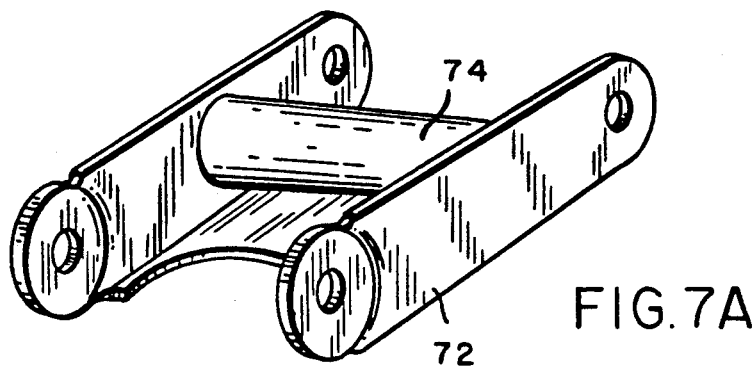
FIG. 7A is a perspective view of a single link of a track of the type shown in FIG. 6.

FIGS. 6 and 7 show an alternative configuration with an external track which overcomes some of these problems. For this embodiment of the invention, the track 70 has a plurality of links 72 one of which is shown in FIG. 7A. Adjacent links are interconnected with rivets, pins or other suitable means to form track 70. Each link 72 has a cutout at each end into which a sphere 18 may be fitted when two adjacent links are mated. Each link 72 also has a roller 74 extending across the underside center thereof which roller performs essentially the same function as track rollers 44 in the earlier embodiment. Alternatively round holes could be provided in the center of each link to receive the spheres, with sphere spacing rollers being mounted to the pins interconnecting the links.

Drive rollers 46 and 48 are provided which perform the same function as the corresponding rollers in the earlier embodiment of holding spheres 18 in place and of driving these spheres for movement in the second direction. A suitable means such as housing shelf 64 would also be provided to prevent spheres 18 from dropping out of track 70 when the spheres are in the upper portion of the track. A drive sprocket 76 and an idle sprocket 78 are also provided for each track, with drive sprocket 76 being connected to a suitable motor 16 in the same manner as the sprockets 34B, 36A previously described.

Track 70 would be mounted in a housing 80 with side plates which in turn would be secured to a track housing 80 for the other track by suitable members such as brackets or housing members 24. As may be best seen in FIG. 7, with this configuration, even though track 70 may sink into mud, soft ground, snow, or other elements so that spheres 18 are completely submerged, links 72 are still being driven and could propel the vehicle 10 forward or backward until firmer ground is reached where the vehicle could again achieve full maneuverability. The external track 70 also permits the vehicle to climb over obstacles having a height which is less than approximately the height H shown in FIG. 6. This capability does not exist for the earlier embodiment.

Figure 8:
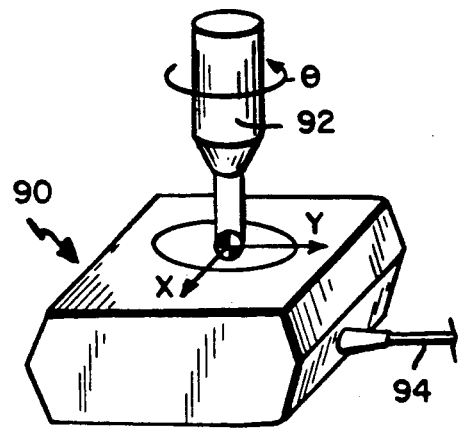
FIG. 8 is a top perspective view of a joystick which might be utilized to control an omnidirectional vehicle constructed in accordance with the teachings of this invention.

FIG. 8 shows a joystick controller 90 which may be utilized for controlling movement of vehicle 10 in the three degrees of freedom illustrated in FIGS. 2A-2G. While the controller may be inside the vehicle for large vehicles, and operated by an operator inside the vehicle, for preferred embodiments the vehicle would be a robotic vehicle with controller 90 being outside the vehicle. As previously discussed, movement of joystick 92 of controller 90 in the X and Y direction as shown in FIG. 8 could result in the vehicle being moved in these directions relative to the vehicle orientation or in the vehicle being moved in these directions relative to an absolute frame of reference. The joystick could provide for motion at any angle A with the extent to which the joystick is moved in the given direction controlling the speed or rate at which the vehicle moves in such direction.

Joystick 92 may also be rotated as shown in the clockwise or counterclockwise direction to cause rotation of the vehicle about its Z axis as shown for example in FIG. 2C. More complex motions such as those shown in FIGS. 2E and 2F may be accomplished by both moving the joystick at a given angle and rotating the joystick.

Output lines 94 from controller 90 include three lines, one of which contains a voltage proportional to the displacement of joystick 92 in the X direction, one of which contains a voltage proportional to the displacement of joystick 92 in the Y direction and one of which contains a voltage proportional to the displacement of the joystick in the direction. These voltages may be positive for a displacement in one direction and negative for a displacement in the opposite direction. Standard joystick circuitry is available for generating these outputs.

Where the joystick is moved at an angle A displaced in the X and Y directions, appropriate voltages will appear on both the X and Y output lines. Where in addition to a displacement of the joystick at an angle A, there is also a displacement in the $\theta$ direction, voltages may appear on all three control lines. These three control lines are the line 96 for voltages proportional to the X direction, 98 for voltages proportional to the Y direction and 100 for voltages proportional to the $\theta$ direction shown in FIG. 9. While for the preferred embodiment such voltages are indicated as being obtained from a joystick controller, it will be apparent that such voltages could also be obtained from other types of controllers available for generating such voltages or that the voltages could be generated automatically from a suitably programmed processing device in response to inputs indicating a desired and detected position for the vehicle. The invention could thus be utilized for an automated operation in an industrial or other environment.

Figure 9:
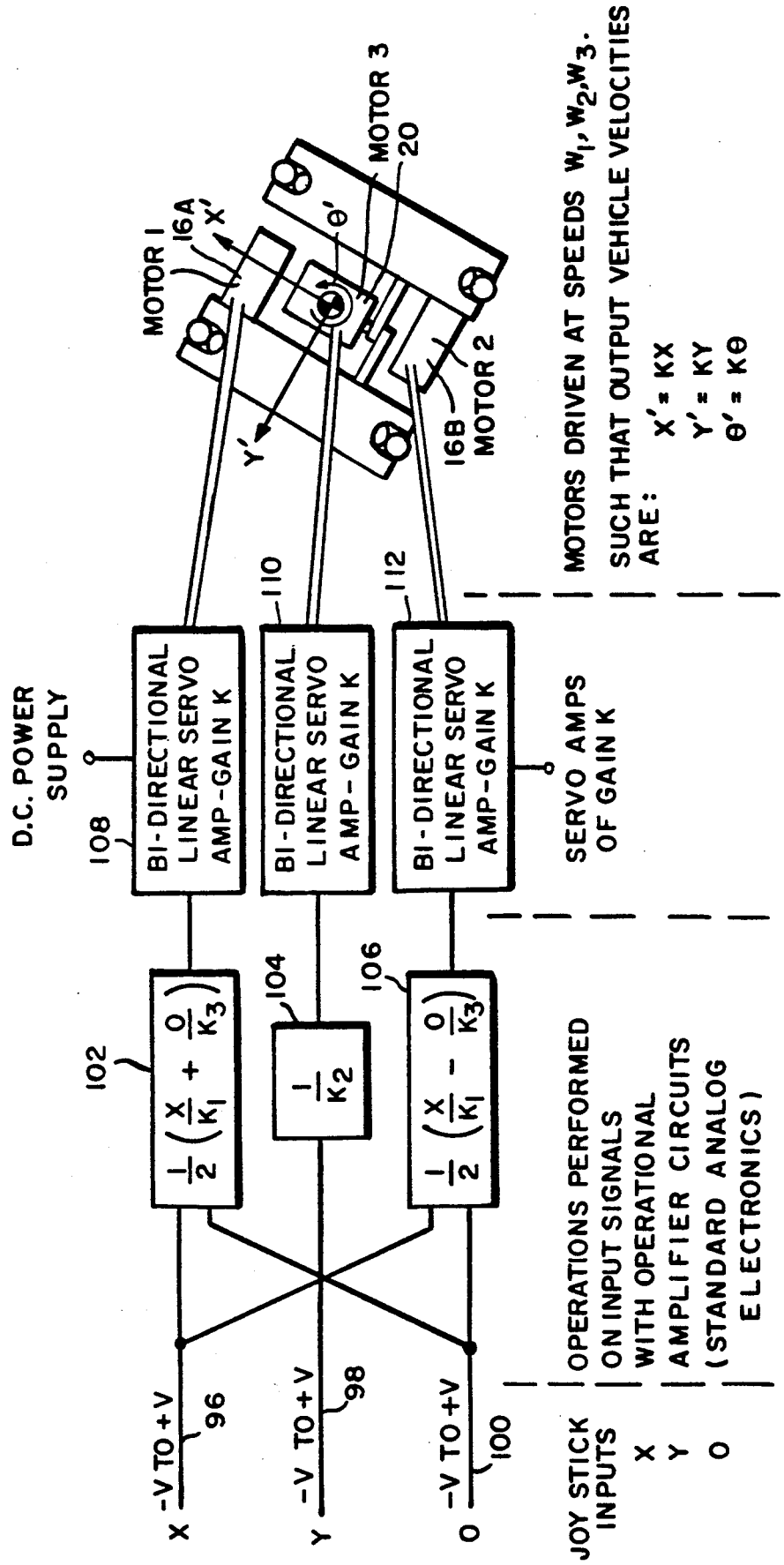
FIG. 9 is a block schematic diagram of control circuitry utilized in conjunction with the joystick of FIG. 8 to control and operate the motors for three motor embodiment of the invention.

Assuming that the joystick positions X, Y and $\theta$ are represented by voltages on lines 96, 98 and 100, respectively, and that the velocity of vehicle 10 in the three directions indicated in FIG. 9 is x' y' and $\theta'$, respectively, the desired relationship is given by:

$$x' = kx \quad (1)$$
$$y' = ky \quad (2)$$
$$\theta' = k\theta \quad (3)$$

where k is a constant defined for a given system.

In the following discussion it will be assumed that, as shown in FIG. 1, there is only a single motor 20 controlling rotation of the spheres 18 to cause movement in the Y direction since this simplifies the controls. However, the situation is not substantially different if motors 20A and 20B are utilized as shown for example in FIG. 3.

Assuming three motors are utilized, the speeds of motors 16A and 16B may be represented by $w_1$ and $w_2$, respectively, and the speed of motor 20 by $w_3$. Using standard kinematic analysis:

$$x' = K_1(w_1 + w_2) \quad (4)$$

Equation 4 indicates that the forward speed of the vehicle is proportional to the sum of the forward speeds of the two tracks. Similarly:

$$y' = K_2(w_3) \quad (5)$$

Indicating that the sideways or Y direction speed of vehicle 10 is proportional to the speed of motor 20. In addition:

$$\theta' = K_3(w_1 - w_2) \quad (6)$$

Reflecting the fact that the rotational speed of the vehicle is proportional to the difference in the speeds of the two tracks. This is because rotation is accomplished by rotating the two tracks (14 or 70) in opposite directions, preferably at the same speed. In equations (1)–(6), K1, K2 and K3 are constants of proportionality, primarily reflecting the transmission ratios between the motor shaft and the vehicle speed.

From equations (1) and (4) above, it may be determined that $$\frac{K}{K_1} X = w_1 + w_2 \quad (7)$$

Similarly from equations (3) and (6) it may be determined that $$\frac{K}{K_3} \theta = w_1 - w_2 \quad (8)$$

Adding equations 7 and 8 gives $$w_1 = \frac{K}{2} \left[ \frac{X}{K_1} + \frac{\theta}{K_3} \right] \quad (9)$$

Substituting equation (9) into equation (7) and simplifying gives $$W_2 = \frac{K}{2} \left[ \frac{X}{K_1} - \frac{\theta}{K_3} \right] \quad (10)$$

Finally, from equations 2 and 5 it can be determined $$w_3 = \frac{Ky}{K_2} \quad (11)$$

Equations (9), (10) and (11) express the motor speeds for motors 16A, 16B and 20 in terms of the input voltage on lines 96, 98 and 100. Since the various K values are constants for a given system, the calculations required to convert input voltages into currents to drive the various motors at the desired speed may be easily computed from equations (9), (10) and (11) using either special purpose computational circuitry or a suitable microprocessor or other processor. In FIG. 9, the required inputs are shown being applied to circuits 102, 104 and 106 which circuits implement equations (9), (11), and (10), respectively, to generate outputs proportional to $w_1$, $w_3$ and $w_2$, respectively. These values are then applied through suitable bi directional linear servo amplifier and gain control circuits 108, 110 and 112, respectively, to control the appropriate motors. The details of how circuits 102, 104, 106, 108, 110 and 112 are implemented do not form part of the present invention and these circuits may be implemented in any suitable manner.

Figure 10A:
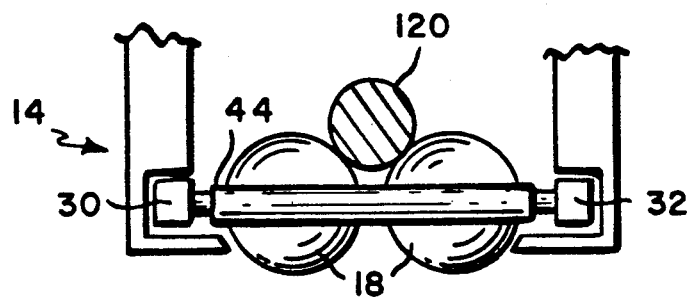
FIG. 10A is a partial sectional view of the track and housing taken along the same section as in FIG. 3 for an alternative embodiment of the invention having two rows of spheres in each track with the spheres in each track being driven by a single roller.

FIG. 10A illustrates an alternative embodiment of the invention wherein, instead of there being a single row of spheres 18 as shown in FIG. 3-5, with two rollers 46 and 48 for driving each row of spheres, there are two rows of spheres 18 in each track with single drive roller 120 being positioned between the spheres and driving both spheres. Housing 14, rollers 44, and chains 30 and 32 would also be provided as for the earlier embodiment. The additional spheres provide more points of contact, and greater weight support, and superior lateral motion.

Figure 10B:
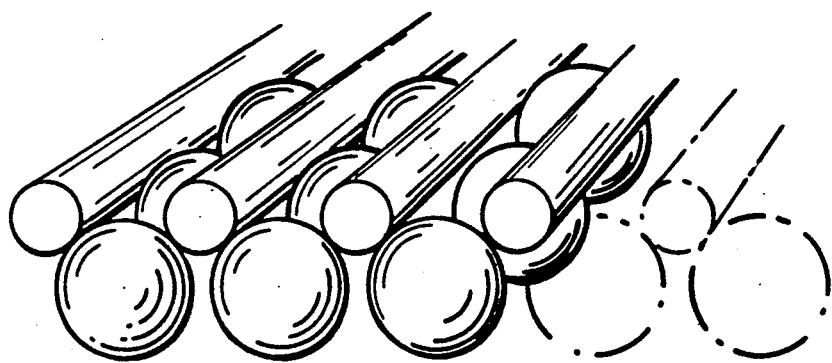
FIG. 10B is a perspective view illustrating a portion of an embodiment of the invention having multiple rows of spheres per track.

As may be seen in FIG. 10B, other combinations of spheres 18 and drive rollers are also possible. Thus, in addition to the single drive roller 120 shown in FIG. 10A, idler rollers may also be provided on the other side of each of the spheres to provide more stable support for the spheres. Additional rows of spheres with corresponding additional drive or passive rollers may also be provided.

Figure 11:
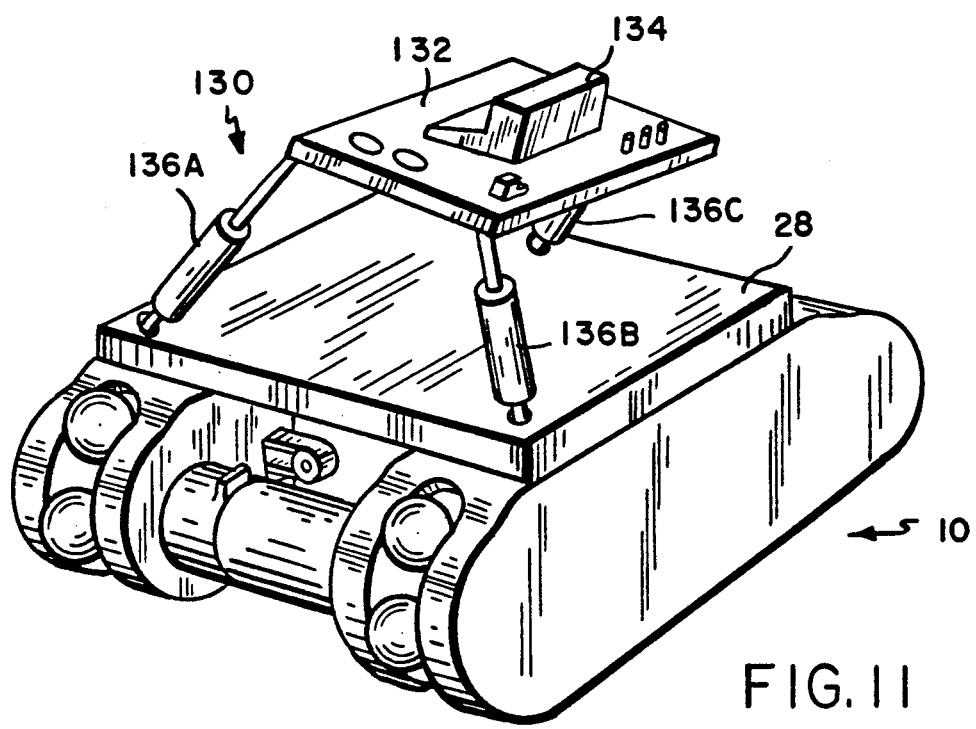
FIG. 11 is a front top perspective view of an omnidirectional vehicle incorporating the teachings of this invention having a robot mounted thereon which permits independent movement of an object in six degrees of freedom.

FIG. 11 illustrate an application of the vehicle of this invention wherein the vehicle 10 is being used for automated transportation of workpieces, materials, tools or the like in a manufacturing facility. The vehicle 10 may be considered a three degree of freedom manipulator with unlimited work space. This is advantageous over conventional robot arms having a fixed face which limits that workspace and are normally cantilevered which limits both stiffness and, hence, accuracy. In FIG. 11, a parallel actuator 130 having three degrees of freedom is mounted on a platform 28 fixed to vehicle 10. This creates a six degree of freedom manipulator with infinite work space and inherent accuracy due to the stiff closed kinematic chain structure. The ability to control the position and movement of objects in six degrees of freedom in a workspace encompassing a whole factory could facilitate flexible manufacturing and assembly by removing the need for fixed material conveyors or dedicated robot arms. In the illustrative example shown, manipulator 130 consists of a platform 132 on which a workpiece or other element to be positioned is mounted. Platform 132 may be raised or lowered or rotated about the X o Y axis by suitably actuating selected combinations of pistons or other actuators, 136A, 136B and 136C. As previously discussed, movement in the X and Y directions and rotation about the Z axis are provided by vehicle 10, thus providing a full six degrees of freedom.

FIG. 12 shows another somewhat modified embodiment of the invention which is similar to FIG. 10B but turned upside down. In particular, FIG. 12 illustrates an omnidirectional conveyor having a single track with multiple rows of spheres which may be driven in the X direction by driving a track in the manner previously discussed and in the Y direction by operating drive rollers 140 in the manner previously discussed. The omnidirectional conveyor may, for example, be placed between the single conventional conveyor 142 and a plurality of output conveyor 144A-144C extending at different angles to cause an object 146 entering the omnidirectional conveyor 138 to be directed to the appropriate output conveyor 144. Further, by turning vehicle 10 upside down, fixing it to a surface, and mounting a platform on tracks 14, a fully controllable three degree of freedom omni directional positioning device is provided.

While the invention has been particularly shown and described above with reference to preferred embodiments, and various modifications in such embodiments have been discussed, it will be apparent to those skilled in the ar that further modifications may be made in the embodiments shown while still remaining within the spirit and scope of the invention. The scope of the invention is, therefore, to be limited only by the following claims.

What is claimed is:

1. An omnidirectional vehicle comprising:
a) a first track mounted to said vehicle;
b) a second track mounted to said vehicle parallel to and spaced from said first track;
c) first means for independently driving said first track and said second track in a first direction;
d) a plurality of spheres mounted in each of said tracks at intervals spaced in said first direction;
e) second means for driving the spheres in at least one of said tracks to rotate in a second direction generally perpendicular to said first direction; and
means for controlling said first and second means to move the vehicle in a desired direction.

2. A vehicle as claimed in claim 1 wherein said first means includes separate first and second motors, each of said motors having a rotating output shaft, and means for connecting the output shaft of the first motor to drive the first track and the output shaft of the second motor to drive the second track.

3. A vehicle as claimed in claim 1 wherein said second means includes at least one third motor having a rotating output shaft, and means for connecting the output shaft of the third motor to drive the spheres on at least one of said tracks.

4. A vehicle as claimed in claim 3 wherein said third motor drives the spheres in one of said tracks, and including a fourth motor for driving the spheres in the other track.

5. A vehicle as claimed in claim 3 wherein a selected plurality of the spheres in each track are in contact with a surface on which the vehicle is to move at any given time, the spheres in contact with the surface in each track changing as the tracks are driven;

and wherein the connecting means for the third motor includes a roller means in friction contact with at least selected ones of the spheres of a given track in contact with the surface at each time, and means for connecting the third motor output shaft to rotate said roller in said second direction.

6. A vehicle as claimed in claim 5 wherein there is a roller for each of said tracks in friction contact with the spheres thereof, and wherein the third motor output shaft is connected to rotate the rollers for both tracks.

7. A vehicle as claimed in claim 5 wherein there are two rollers for each track, both of which are in friction contact with at least selected ones of the spheres, the third motor output shaft being connected to rotate at least one of the rollers for at least one of the tracks.

8. A vehicle as claimed in claim 5 including a second plurality of spheres mounted in each of said tracks at spaced intervals in said first direction, the second plurality of spheres in each track being spaced in said second direction from the plurality of spheres in such track, and wherein the roller means for a given track is in friction contact with selected spheres from both plurality of spheres for the track.

9. A vehicle as claimed in claim 3 wherein said motors are electric motors, and wherein said means for controlling controls the drive current applied to each of said motors.

10. A vehicle as claimed in claim 1 wherein the vehicle moves on a selected surface, wherein said means for controlling includes means for indicating the desired direction of movement with reference to a selected prospective parallel to said surface, and means responsive to said indicating means for controlling the first and second driving means.

11. A vehicle as claimed in claim 10 wherein said means for indicating includes means for indicating a desired rotation of said vehicle about an axis perpendicular to said surface and means responsive to the indications of desired rotations for selectively operating at least said first means to rotate said vehicle about said axis.

12. A vehicle as claimed in claim 11 wherein said means for indicating is a joystick controller, said controller having a rotational input to indicate a desired rotation.

13. A vehicle as in claim 10 wherein said perspective is from within the vehicle, the first direction being the direction which the vehicle is facing.

14. A vehicle as claimed in claim 10 wherein said perspective is from outside the vehicle, the first direction being a selected direction on a surface on which to vehicle is moving.

15. A vehicle as claimed in claim 1 wherein said tracks are inside the vehicle, only said spheres projecting from the vehicle.

16. A vehicle as claimed in claim 15 wherein each track includes at least one low friction roller in the spaces between successive spheres in said first direction, and chain means interconnecting said rollers, said first means interacting with said chain means to drive the track.

17. A vehicle as claimed in claim 1 wherein said tracks are outside said vehicle, each of said tracks including a plurality of interconnected link means, and means for mounting said sphere in the link means so as to cause less than half of each sphere to project from the link means.

18. A vehicle as claimed in claim 1 wherein said means for controlling controls both the rate and directions of movement of said vehicle.

19. A vehicle as claimed in claim 1 wherein said means for controlling controls said first and second means to also control rotation of the vehicle about an axis perpendicular to both the first and second directions.

20. A device for providing controlled omnidirectional relative movement between the device and a selected surface in contact with the device comprising:
   a) a first track mounted to said device;
   b) a second track mounted to said device parallel to and spaced from said first track;
   c) first means for independently driving said first track and said second track in a first direction;
   d) a plurality of spheres mounted in each of said tracks at intervals spaced in said first direction;
   e) second means for driving the spheres in at least one of said tracks to rotate in a second direction generally perpendicular to said first direction; and
   means for controlling said first and second means to create relative movement in a desired direction between the device and the surface.

21. A device as claimed in claim 20 wherein the device is stationary and the surface is on a movable platform resting on the device.

* * * * *